US006862979B1

(12) United States Patent
Silvestrini

(10) Patent No.: US 6,862,979 B1
(45) Date of Patent: Mar. 8, 2005

(54) THERMAL CONDITIONING SYSTEM FOR HEATING AND COOLING CYLINDRICAL CONTAINERS

(76) Inventor: Jesus Antonio Silvestrini, 5544 Barrio Palmares, Godoy Cruz, Mendoza (AR)

( * ) Notice: Subject to any disclaimer, the term of this patent is extended or adjusted under 35 U.S.C. 154(b) by 0 days.

(21) Appl. No.: 10/916,858

(22) Filed: Aug. 12, 2004

(51) Int. Cl.[7] .............................. A23L 1/00; F27B 9/00; F27D 3/00
(52) U.S. Cl. ............................. 99/361; 99/360; 99/365; 99/367; 99/470
(58) Field of Search .......................... 99/330, 339, 340, 99/359–371, 386, 403–406, 443 C, 443 R, 467–470, 483; 432/121, 236, 246; 422/307–309; 426/510, 509, 511, 521–523

(56) References Cited

U.S. PATENT DOCUMENTS

| | | | | |
|---|---|---|---|---|
| 1,445,196 A | * | 2/1923 | Berry ........................... | 99/363 |
| 2,043,310 A | * | 6/1936 | Thompson ................... | 426/407 |
| 2,225,137 A | * | 12/1940 | Thompson ............. | 198/370.01 |
| 3,510,320 A | * | 5/1970 | Reimers ....................... | 99/365 |
| 3,528,363 A | * | 9/1970 | Creed ........................... | 99/365 |
| 3,528,540 A | * | 9/1970 | Reimers .................. | 198/481.1 |
| 3,544,341 A | * | 12/1970 | Reimers ..................... | 426/405 |
| 3,563,161 A | * | 2/1971 | Mencacci .................... | 99/366 |
| 3,576,159 A | * | 4/1971 | Reimers ....................... | 99/365 |
| 5,215,002 A | * | 6/1993 | Veltman ....................... | 99/361 |
| 5,259,301 A | * | 11/1993 | Veltman ....................... | 99/365 |
| 5,533,438 A | * | 7/1996 | Veltman ....................... | 99/360 |
| 5,685,216 A | * | 11/1997 | Veltman et al. ............... | 99/361 |

\* cited by examiner

Primary Examiner—Timothy F. Simone
(74) Attorney, Agent, or Firm—Carlton Fields, P.A.

(57) ABSTRACT

A thermal conditioning system for heating and cooling cylindrical containers includes a container heating apparatus with an enclosed heating chamber, transport mechanism for movement of the containers through the heating chamber, a cooling apparatus positioned below the heating chamber, and conveyor systems for introducing containers into the heating chamber and form removing the containers from the cooling apparatus after they have passed through the system.

9 Claims, 6 Drawing Sheets

THERMAL CONDITIONING SYSTEM FOR HEATING AND COOLING CYLINDRICAL CONTAINERS

BACKGROUND OF THE INVENTION

In the food processing and canning industry there has long been a requirement for heating and cooling the canned product. Various types of equipment have long existed for such thermal conditioning of containers, such as cans. Exemplary of such equipment is that shown in U.S. Pat. No. 1,445,196 to Berry and in U.S. Pat. No. 2,043,310 to Thompson. In such prior art equipment are passed along a first helical path within a heating chamber and are then moved to a separate cooling chamber along side the heating chamber. While this equipment performs its designed function, it is bulky and requires considerable space for installation, space which is frequently at a premium in a packing facility. Much of this prior art equipment has also presented difficulties in maintenance and cleaning due to the fixed housing for containing the cooking steam.

SUMMARY OF THE INVENTION

It is an object of the present invention to provide an apparatus for heating and cooling cylindrical containers that overcomes the disadvantages of the prior art equipment. It is a further object of the invention to provide such apparatus that is rugged and durable and provides for simplified operation and cleaning.

To achieve the foregoing as well as other objects that will become apparent to those skilled in the art, a thermal conditioning system for heating and cooling cylindrical containers is disclosed and includes a container heating apparatus, a heating transport apparatus for supporting movement of the containers through the heating chamber, an introduction conveyor for introducing containers into the heating chamber from outside that chamber, container cooling apparatus positioned generally below the heating chamber, and an exit conveyor for moving the containers from the cooling apparatus to a location outside the heating apparatus and cooling apparatus. The container heating apparatus includes a heating chamber of generally cylindrical configuration with a generally vertical cylindrical axis, with that chamber including a housing enclosing the heating chamber and having a generally cylindrical configuration generally coaxial with the heating chamber axis, and a heating fluid introduced into the chamber for heating the containers within the heating chamber. The heating transport apparatus includes the plurality of generally circular tracks carried by track support and spaced apart from one another along the cylindrical axis, a transport mechanism for moving the containers around those tracks, and a transfer structure for moving the containers from one such track to an adjacent lower such track. The container cooling apparatus includes a cooling fluid spray, and transport apparatus generally coaxial with the heating chamber transport apparatus, with that transport apparatus further including a plurality of generally circular tracks carried by a track support and spaced apart from one another along the cylindrical axis, the first such circular track being positioned directly below the lowermost such heating apparatus track for receiving heated containers therefrom, and further includes a transport mechanism for moving the containers around the tracks, and a transfer structure for moving the containers from one such track to an adjacent lower track.

BRIEF DESCRIPTION OF THE DRAWINGS

To illustrate further the principles of this invention, a preferred embodiment will be described in detail in which.

DESCRIPTION OF PREFERRED EMBODIMENTS

Figure 1:
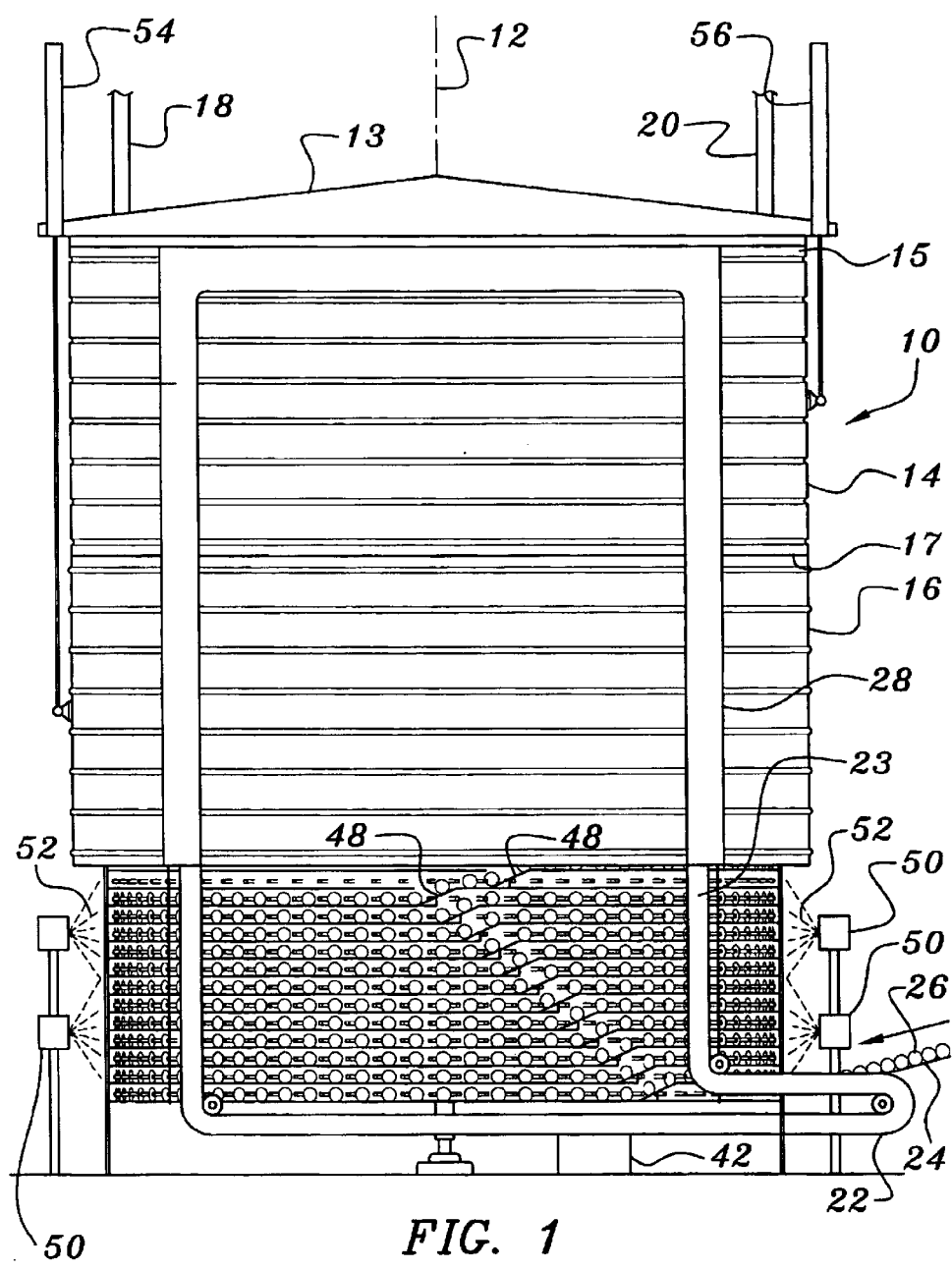
FIG. 1 is a side elevation of one embodiment of the thermal conditioning apparatus of this invention.

A particularly preferred embodiment of the thermal conditioning apparatus of this invention is illustrated in the elevational view of FIG. 1. This apparatus includes a heating chamber 10 of generally cylindrical configuration with a generally vertical cylindrical axis 12. This heating chamber comprises a housing, which suitably comprises a plurality of axially adjacent sections, such as upper section 14 and lower section 16, each having a generally cylindrical configuration and being generally coaxial with the heating chamber axis 12 and a generally circular top portion 13. This heating chamber 10 is further provided with sources for introducing a heated fluid, such as steam, into the chamber. These sources may conveniently be pipes 18 and 20, which are connected to conventional steam generators (not shown), to provide a supply of this heated fluid for heating the chamber 10.

The apparatus of this system also includes an introduction conveyor 22 for introducing containers into the heating chamber from outside. The containers to be introduced are preferably of right circular cylindrical configuration, such as cans or canned food products. A ramp 24, or other suitable structure, brings the containers, preferably with their cylindrical axes generally horizontal, to the introduction conveyor 22. Conveniently, as shown in the drawings, the ramp 24 and conveyor 22 are configured to provide end-to-end pairs of the cylindrical containers 26 onto the conveyor 22 or, if desired, may provide for introduction of individual containers, or groups of three, four or more containers. The introduction conveyor 22 is of conventional construction and includes a plurality of flights, each spaced apart from the adjacent flight to receive one of the containers 26, or, in this case, a pair of such containers end-to-end. As shown in FIG. 1, the introduction conveyor 22 preferably receives the containers 26 on a horizontal portion and then carries them in a generally vertical direction up to a location close to the top of the heating apparatus. As the containers are lifted in the introduction conveyor, they enter a closed channel 28, which, in this embodiment, first runs vertically and then horizontally adjacent to the top of the apparatus, with the conveyor then returning back down through another vertical portion of the channel to the bottom of the equipment, as shown in FIG. 1.

Figure 2:
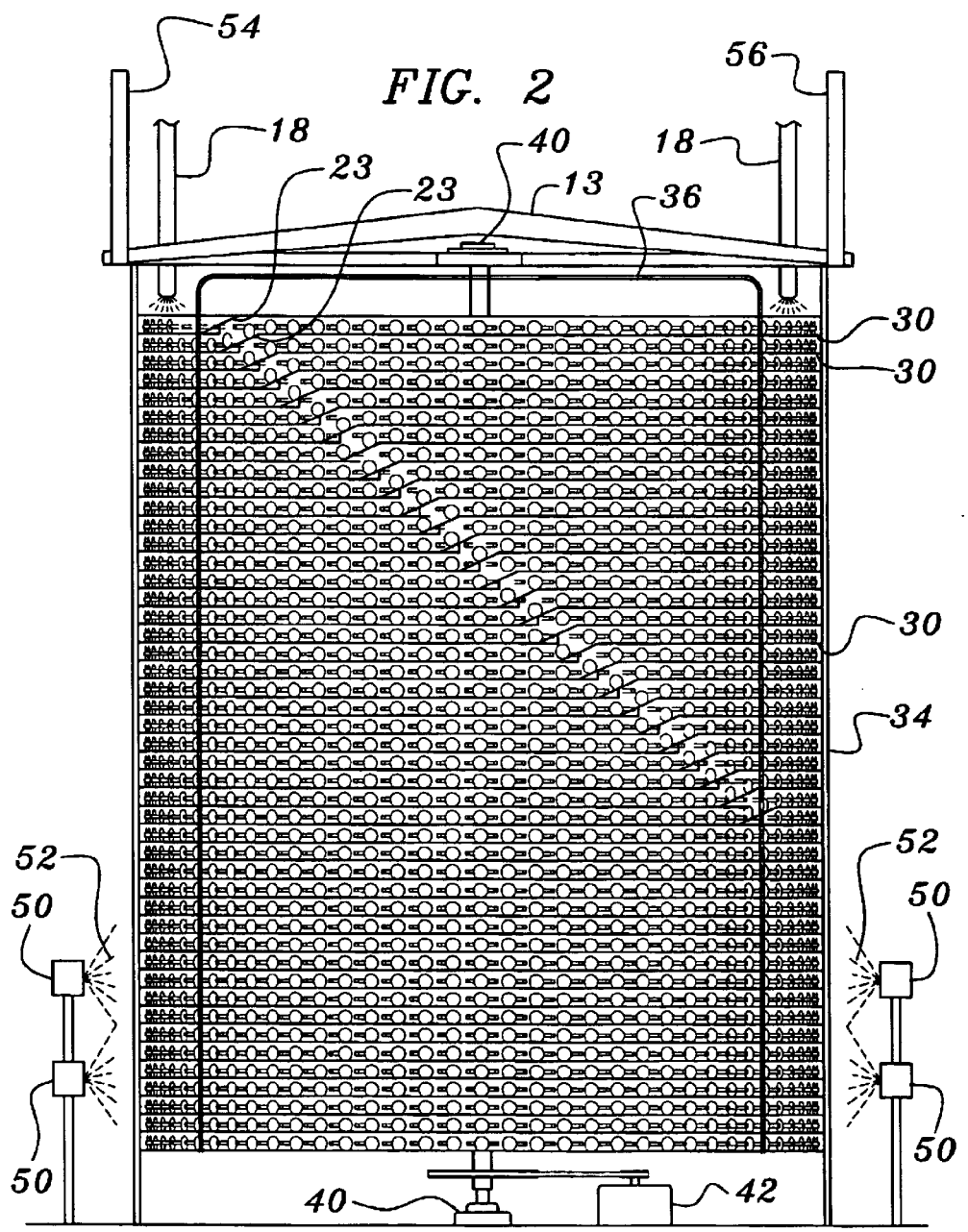
FIG. 2 is a side elevation of the apparatus of FIG. 1 with the housing and introduction conveyor removed to more clearly illustrate the internal structure.
Figure 3:
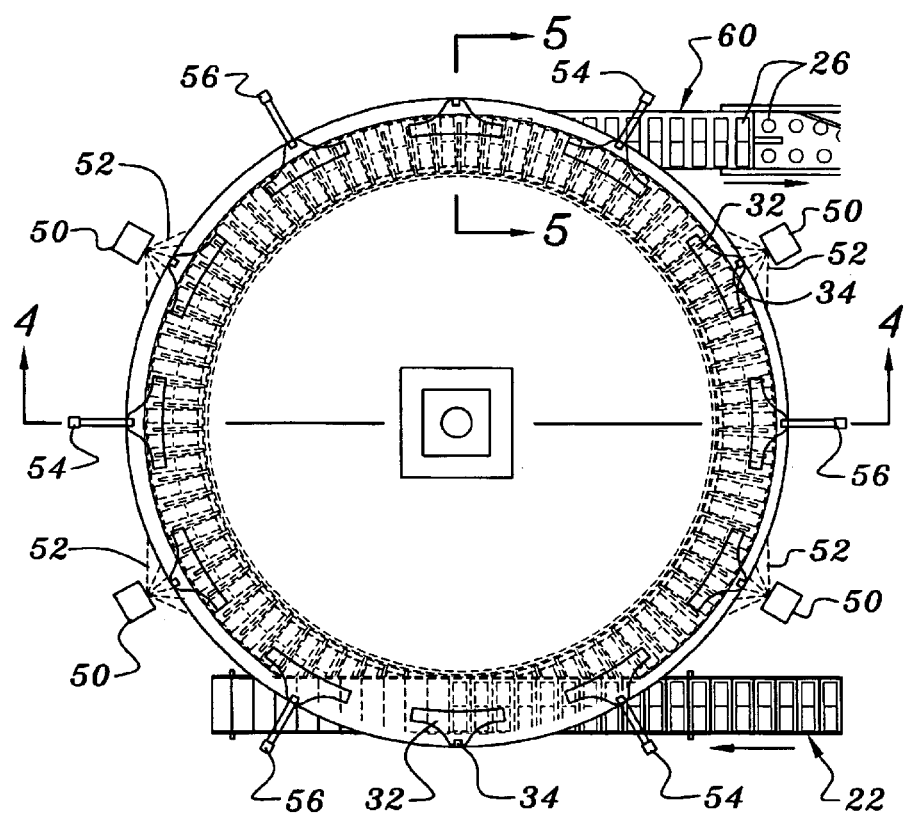
FIG. 3 is a top plan view of the apparatus of FIG. 1, with the cylindrical heating chamber housing removed.
Figure 4:
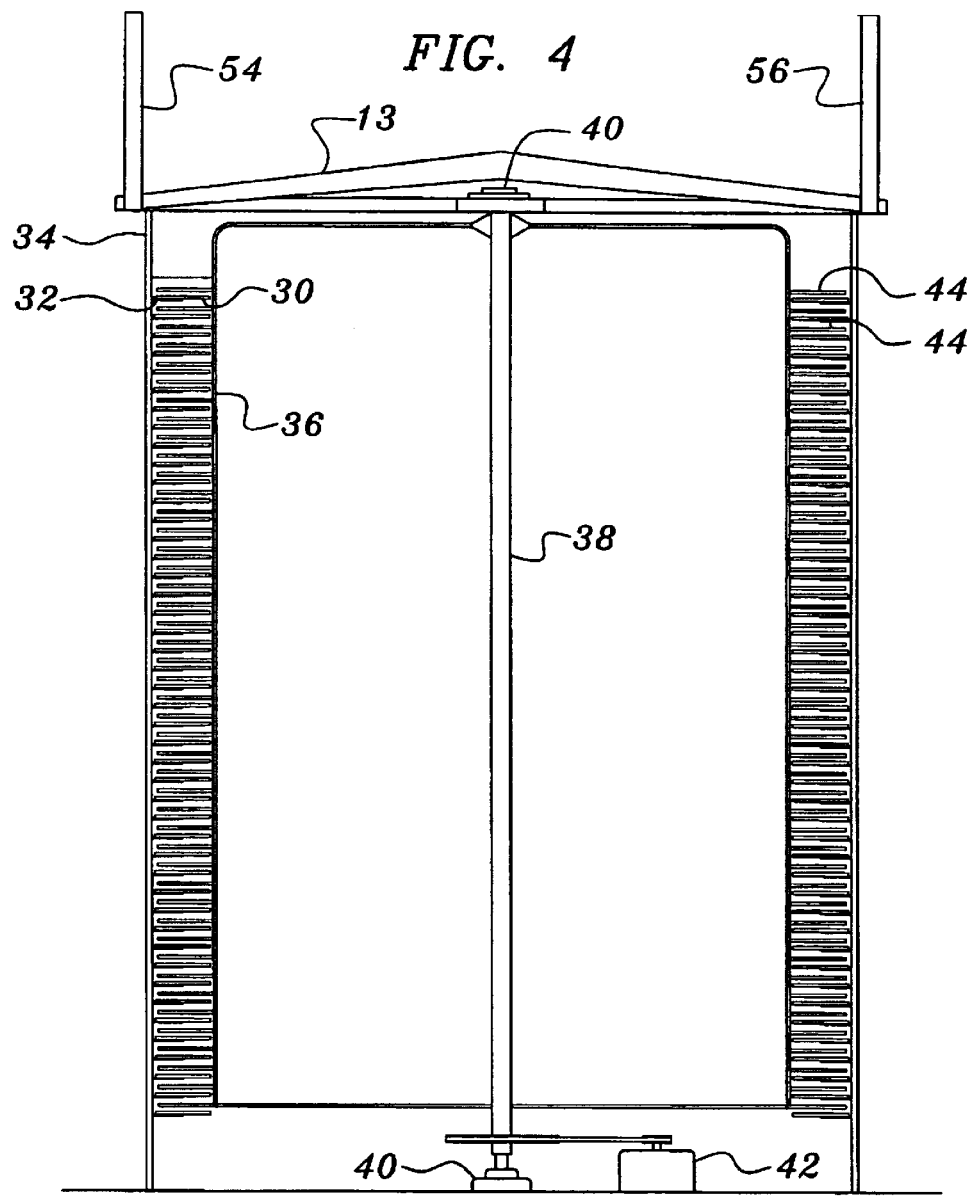
FIG. 4 is a sectional view of the apparatus of FIGS. 1–3 taken along line 44 of FIG. 3, with the containers deleted from the transport apparatus to more clearly illustrate the structure.

FIG. 2 is a side elevation of the apparatus of this invention, with the chamber housing removed to illustrate the structure within. Similarly, FIG. 3 is a top plan view of this apparatus, with the heating chamber housing removed, and FIG. 4 is a sectional elevational view taken along line 44 of FIG. 3 to illustrate the components of the transport apparatus included in that heating chamber. As shown in FIG. 2, the heating transport apparatus includes a plurality of generally circular tracks 30, shown in phantom on FIG. 3, that are carried by track supports 32 (shown most clearly in the fragmentary sectional view of FIG. 5, taken along line 5—5 of FIG. 3).

In the sectional elevational view of FIG. 4 is illustrated the transport mechanism for moving the containers around these tracks 30. The transport mechanism of this embodiment comprises a rotatably mounted cylinder or drum 36 having a generally vertical axis and mounted, suitably by means of a central shaft 38 and conventional bearings 40, for rotation about this vertical axis. As shown on FIG. 4, the drum is rotationally driven by conventional means, such as a conventional electric motor or the like 48, connected to the drum central shaft 38 by conventional means, such as pulleys and belts or chains and sprockets, which are well known to those in the art. Suitably, this drive motor 42 is also used to drive the introduction conveyor 22, so that rotation of the cylinder 36 is synchronized with movement of the introduction conveyor 22.

Figure 5:
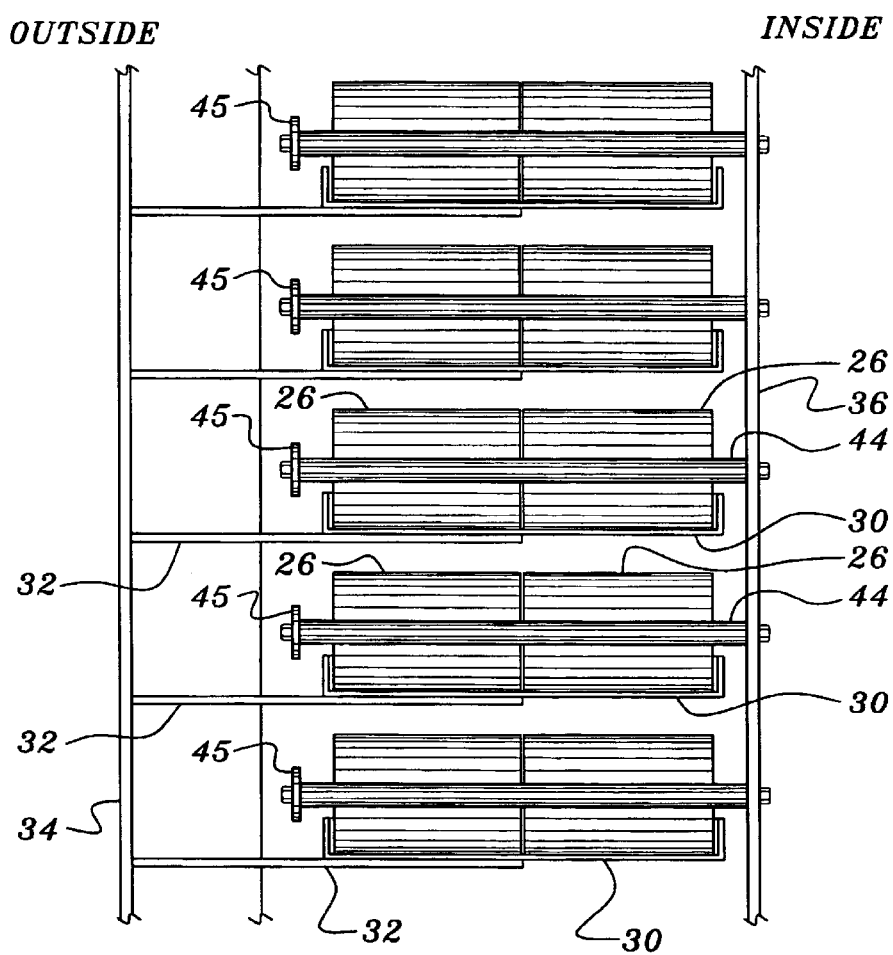
FIG. 5 is a fragmentary sectional elevation taken along lines 5—5 of FIG. 3.

As shown in FIG. 4 and more clearly in the fragmentary sectional view of FIG. 5, there are attached to the rotating cylinder 36 a plurality of pusher elements 44 extending generally radially outwardly from the rotating cylinder 36 and positioned to engage the cylindrical containers 26. Thus, rotation of the rotating cylinder 36 about its shaft 38 will urge the containers 26 around the circular track 30. The radially outer ends of the pusher elements 44 adjacent a given track 30 are connected to a continuous ring 45, as is shown in FIG. 5.

As shown on FIG. 2, each of the circular tracks includes at one point an opening in the track with a ramp 46 extending angularly downwardly from one such track 30 toward the respective subjacent, or next lower track, such that containers moving around each track will, upon encountering the opening and ramp 46, move down the ramp from the one circular track to the next subjacent track. In this manner the containers 26 that are being moved around the tracks will sequentially move to each lower track, until they are discharged from the entire apparatus.

Figure 6:
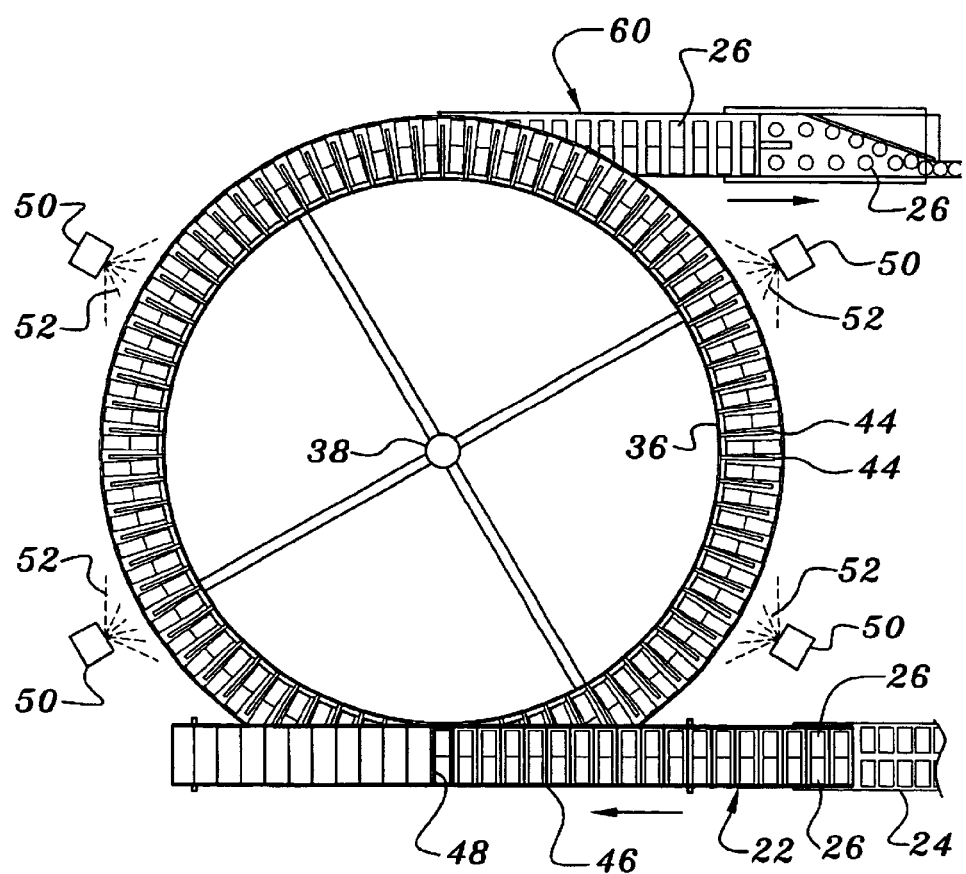
FIG. 6 is top plan view of the apparatus of FIG. 1 with the cylindrical housing removed to illustrate more clearly the introduction of the containers into the heating apparatus transport mechanism and the removal of the containers from that transport apparatus.

FIG. 6 is a simplified top view similar to that of FIG. 3, but with the top cover of the housing removed and the circular track supports removed to illustrate the manner of movement of the containers 26 through the equipment. As the containers 26 are introduced from the ramp 24 onto the horizontal portion of the introduction conveyor 22, they first move horizontally, and then vertically (FIG. 1) up to a point adjacent to the top of the apparatus, where the conveyer again resumes a horizontal movement that overlaps the top circular track 30. As described above, this conveyor includes a plurality of flights that push the containers 26 along a track 23, which preferably has a flat bottom portion with sides extending generally perpendicular to that bottom portion to support the containers as they are moved by the conveyor flights. At the point where the transport conveyor 22 is directly above the topmost circular track, there is provided an opening 48 in that track 23. That opening 48 permits the containers 26 to drop through that opening onto the immediately subjacent upper circular track, between adjacent pusher elements 44. As noted above, the movement of the rotating cylinder 36, and thus the pusher elements 44, is synchronized with the movement of the flights of the introduction conveyor 22. Once on this uppermost circular track, the containers 26 then move around that track until they encounter the opening and ramp 46 down to the next lower track, and then proceed through the heating chamber. While in that heating chamber, which is enclosed by the cylindrical segments 14 and 16, the containers are subject to a heating fluid, such as steam, introduced through the conduits 18 and 20. The steam effects heating of the interior of the heating chamber, and thus of the containers that are circulating through it.

As shown in FIG. 1, the heating chamber housing encloses the upper portion of the overall apparatus, with a lower portion, including a number of the circular tracks 30, outside those cylindrical housings 14 and 16. The heated fluid, such as steam, is contained in the enclosed portion, because of the heat tending to rise. As the steam may condense on the structures, it may drain to receptacles (not shown) below the apparatus. As the cylindrical containers 26 continue in their process through the apparatus, they ultimately proceed through an opening in one of the tracks at the lowermost portion of the heating chamber housing portion 16 to the next lower track, which is shown in FIG. 1 to be outside that housing portion 16. This group of cylindrical tracks below the heating chamber housing comprises the transport apparatus of the container cooling apparatus. This apparatus includes the circular tracks and their drive mechanism, including the cylinder 36 and pusher elements 44, substantially identical to the transport apparatus in the heating chamber, and also a plurality of dispensers 50 dispensing a cooling fluid spray 52, such as a cool water spray. The cooling fluid is supplied through a conventional conduit from a conventional source (not shown). As shown on FIGS. 1 and 2, when the containers reach the lowermost track 30 that is within the heating chamber, the openings 48 in that track and at least the next adjacent lower track are positioned close together to facilitate the fast passage of containers from the heating chamber to the cooling apparatus. Subsequent to that passage to the cooling apparatus, the containers then proceed around each adjacent lower track 30 before encountering another ramp 48 downwardly to the next subjacent track, thus maximizing their exposure to cooling sprays. As the containers are moved around the circular tracks between the lowermost portion of the heating chamber housing and the lowermost circular circular track, the application of the cooling fluids spray will cool the containers 26, suitably to the final temperature required for the process.

The lowermost circular track 30 has its opening and downwardly extending ramp positioned, in this illustrative embodiment, on the side of the apparatus opposite that of the introduction conveyor 22. An exit conveyor 60, conveniently of similar structure to the introduction conveyor 22, is provided and likewise synchronized with the movement of the transport apparatus and the introduction conveyor. This exit conveyor 60 carries the containers to a conventional stacking apparatus, which preferably turns the containers onto their ends for removal for further processing and subsequent distribution.

As shown in FIG. 1, the heating chamber housing of this embodiment is generally of the shape of a right circular cylinder, and preferably is made up of two axially adjacent sections 14 and 16. Preferably the upper cylindrical section 14 engages the circular top portion 13 of the heating chamber with a resilient steam seal 15, suitably formed from a synthetic polymer. Similarly, lower cylindrical section 16 preferably engages the upper section 14 with a similar resilient steam seal 17. These sections are supported for axial movement by linear actuators 54 and 56, respectively, which suitably may be pneumatic or hydraulic cylinders. As shown in the broken lines on FIG. 1, actuation of these cylinders 54 and 56 permits the selective axial displacement of the cylindrical sections 14 and 16. In a first position, with both these segments raised, the heating chamber is completely enclosed by these two sections. In a second position, with the actuating cylinders extended, the heating chamber sections are selectively lowered, either together, or with the lower section being lowered individually, to expose at least a portion of the heating chamber for maintenance and cleaning, as desired.

While other embodiments of this invention will be readily apparent to those skilled in the art, the foregoing is intended to be descriptive only of the principles of the invention and is not intended to the limitative thereof. Accordingly, the scope of this invention is to be defined set forth below.

What is claimed is:

1. A thermal conditioning system for heating and cooling cylindrical containers, comprising
    container heating apparatus comprising
        a heating chamber of generally cylindrical configuration with a generally vertical cylindrical axis, said chamber including
        a housing enclosing said heating chamber and having a generally cylindrical configuration generally coaxial with said heating chamber axis, and
        a heated fluid introduced into said chamber for heating said containers within said heating chamber;
    heating transport apparatus for supporting movement of said containers through said heating chamber, said transport apparatus comprising:
        a plurality of generally circular tracks carried by track supports and spaced apart from one another along said cylindrical axis;
        a transport mechanism for moving said containers around said tracks; and
        a transfer structure for moving said containers from one said said track to an adjacent, lower said track;
    introduction conveyor apparatus for introducing containers into said heating chamber from outside said chamber;
    container cooling apparatus positioned generally below said heating chamber, said cooling apparatus including
        a cooling fluid spray, and
        transport apparatus generally coaxial with said heating chamber transport apparatus and comprising
            a plurality of generally circular tracks carried by a track support and spaced apart from one another along said cylindrical axis, the first said circular track being positioned directly below the lowermost said heating apparatus track for receiving heated said containers therefrom;
            a transport mechanism for moving said containers around said tracks; and
            a transfer structure for moving said containers from one said said track to an adjacent, lower said track; and
    exit conveyor apparatus for moving said containers from said cooling apparatus to a location outside said heating apparatus and said cooling apparatus.

2. The thermal conditioning system of claim 1 wherein said transport mechanism comprises a cylinder mounted for rotation about said heating chamber axis and includes a plurality of pusher elements extending generally radially outwardly of said cylinder and positioned to engage said containers, and wherein said thermal conditioning system further comprises a drive motor connected to said cylinder for rotational movement of said housing, whereby the rotation of the cylinder urges the containers around the circular tracks of the heating chamber.

3. The thermal conditioning system of claim 2 wherein said pusher elements are positioned circumferentially about said housing and said pusher support structure and are spaced apart sufficiently to permit only one said container between adjacent said pusher elements.

4. The thermal conditioning system of claim 3 wherein said introduction conveyor introduces said containers into said heating chamber onto the uppermost said circular track, and wherein said housing drive motor is connected to said introduction conveyor and synchronized with said rotation of said housing such that a single said container is introduced between each adjacent pair of said pusher elements.

5. The thermal conditioning system of claim 1 wherein said container transfer structure comprises, for both said heating transport and said cooling structure transport, a ramp on each said track extending angularly downwardly from one said track to the respective subjacent track, whereby the containers move down the ramps from one circular track to the next subjacent track.

6. The thermal conditioning system of claim 1 wherein said tracks in said cooling apparatus are outside said heating chamber.

7. The thermal conditioning system of claim 1 wherein said heating chamber housing is generally of the shape of a right circular cylinder and is mounted for generally vertical movement between a first position surrounding and enclosing said heating chamber and a second position lowered from said first position and exposing at least a portion of said heating chamber for access thereto.

8. The thermal conditioning system of claim 7 wherein said heating chamber housing comprises a plurality of axially adjacent cylindrical segments, each said segment being movable with respect to any adjacent said segment and with respect to the heating transport apparatus.

9. The thermal conditioning system of claim 1 wherein said introduction conveyor introduces said containers into said heating chamber onto the uppermost said circular track, and wherein the housing drive motor is further connected to said introduction conveyor for generally synchronous movement of said introduction conveyor and said pusher elements.

* * * * *